US012775286B2

(12) United States Patent
Yoneda et al.

(10) Patent No.: US 12,775,286 B2
(45) Date of Patent: Oct. 27, 2026

(54) SERVER APPARATUS FOR CONTROLLING A FLIGHT VEHICLE, CONTROL METHOD AND NON- TRANSITORY COMPUTER-READABLE MEDIUM

(71) Applicants: NEC Corporation, Tokyo (JP); NEC Networks & System Integration Corporation, Tokyo (JP); NEC Nexsolutions, Ltd., Tokyo (JP)

(72) Inventors: Yuki Yoneda, Tokyo (JP); Iori Yamaki, Tokyo (JP); Nanami Yamamoto, Tokyo (JP); Masahiro Kawazoe, Tokyo (JP)

(73) Assignees: NEC CORPORATION, Tokyo (JP); NEC Networks & System Integration Corporation, Tokyo (JP); NEC Nexsolutions, Ltd., Tokyo (JP)

( * ) Notice: Subject to any disclaimer, the term of this patent is extended or adjusted under 35 U.S.C. 154(b) by 255 days.

(21) Appl. No.: 18/283,054

(22) PCT Filed: Mar. 22, 2021

(86) PCT No.: PCT/JP2021/011705

§ 371 (c)(1),
(2) Date: Sep. 20, 2023

(87) PCT Pub. No.: WO2022/201243

PCT Pub. Date: Sep. 29, 2022

(65) Prior Publication Data

US 2024/0168498 A1 May 23, 2024

(51) Int. Cl.
*G05D 1/667* (2024.01)
*G05D 101/00* (2024.01)
*G05D 105/28* (2024.01)

(52) U.S. Cl.
CPC ......... *G05D 1/667* (2024.01); *G05D 2101/22* (2024.01); *G05D 2105/28* (2024.01)

(58) Field of Classification Search
CPC . G05D 1/667; G05D 2101/22; G05D 2105/28
See application file for complete search history.

(56) References Cited

U.S. PATENT DOCUMENTS 9,359,074 B2 * 6/2016 Ganesh ................ G06Q 10/083
2012/0261516 A1 * 10/2012 Gilliland ................ B64D 47/00
356/4.01

(Continued)

FOREIGN PATENT DOCUMENTS

JP 2005-263112 A 9/2005
JP 2016-012236 A 1/2016

(Continued)

OTHER PUBLICATIONS

JP Official Communication for Japanese Patent Application No. 2023-508164, mailed on Jul. 9, 2024 with English Translation.

(Continued)

*Primary Examiner* — Ramsey Refai
(74) *Attorney, Agent, or Firm* — .Sughrue Mion, PLLC

(57) ABSTRACT

A server apparatus (10) includes a location information acquisition unit (110), a determination unit (120), and a flight vehicle control unit (130). The location information acquisition unit (110) acquires first location information indicating a location specified as a reception place for an item to be delivered by a flight vehicle (20), and second location information indicating a current location of a receiving person to receive the item. The determination unit (120) determines whether the location indicated by the first location information and the location indicated by the second location information when the flight vehicle (20) is flying satisfy a predetermined criterion. The flight vehicle control unit (130) transmits a command to the flight vehicle, and causes the flight vehicle (20) to execute flight control for (Continued)

performing authentication of the receiving person, when it is determined that the predetermined criterion is satisfied.

10 Claims, 5 Drawing Sheets

(56) References Cited

U.S. PATENT DOCUMENTS

| | | | | |
|---|---|---|---|---|
| 2016/0068264 | A1* | 3/2016 | Ganesh | G08G 5/55<br>701/4 |
| 2017/0011340 | A1* | 1/2017 | Gabbai | G05D 1/667 |
| 2018/0101173 | A1* | 4/2018 | Banerjee | G08G 5/80 |
| 2023/0141818 | A1* | 5/2023 | Cho | G06Q 10/08<br>701/3 |

FOREIGN PATENT DOCUMENTS

| | | | |
|---|---|---|---|
| JP | 2016-088675 | A | 5/2016 |
| JP | 2017-534101 | A | 11/2017 |
| JP | 2018-055692 | A | 4/2018 |
| JP | 2018-165205 | A | 10/2018 |
| JP | 2020-091610 | A | 6/2020 |

OTHER PUBLICATIONS

International Search Report for PCT Application No. PCT/JP2021/011705, mailed on Jun. 15, 2021.

* cited by examiner

SERVER APPARATUS FOR CONTROLLING A FLIGHT VEHICLE, CONTROL METHOD AND NON- TRANSITORY COMPUTER-READABLE MEDIUM

This application is a National Stage Entry of PCT/JP2021/011705 filed on Mar. 22, 2021, the contents of all of which are incorporated herein by reference, in their entirety.

TECHNICAL FIELD

The present invention relates to a technique for delivering an item by utilizing an unmanned flight vehicle.

BACKGROUND ART

In a physical distribution field, a technique for delivering an item by utilizing an unmanned flight vehicle such as a drone instead of a person is considered. One example of a technique utilizing an unmanned flight vehicle for delivery of an item is disclosed in Patent Document 1 described below.

In the technique of Patent Document 1, after arriving at a place of a collection location or delivery destination of a package (item), an unmanned aircraft (unmanned flight vehicle) captures, by a camera mounted thereon, an image of a surrounding situation, and determines whether an image for confirmation for confirming a right holder of the package has been captured therein. Then, when the image for confirmation has been captured therein, the unmanned aircraft recognizes, as a right holder of the package, a person directing the image for confirmation toward the camera at a place of the collection location or the delivery destination, moves to a location of the person, and collects or deliver the package.

As described in Patent Document 1, when a package is delivered by utilizing an unmanned flight vehicle, whether a person being present at a collection location or delivery destination is a person having a legitimate right regarding the package should be determined in order to prevent erroneous delivery or the like of the package. Herein, a person having a legitimate right can also be determined by using a technique such as one disclosed in Patent Document 2 described below.

Patent Document 2 discloses a technique for determining, when an electronic ticket is downloaded to a terminal, whether a person is a person having a legitimate right regarding the electronic ticket, by collating a location registered as a reception place of the electronic ticket, with a current location of the terminal (person).

RELATED DOCUMENT

Patent Document

Patent Document 1: Japanese Patent Application Publication No. 2018-55692
Patent Document 2: Japanese Patent Application Publication No. 2016-12236

SUMMARY OF INVENTION

Technical Problem

When an item is delivered by using an unmanned flight vehicle, observation by a delivering person cannot be performed, and, therefore, high security performance is required in such a way that no trouble (e.g., theft of an item, or the like) at delivery is caused.

The present invention has been made in view of the problem described above. One of objects according to the present invention is to provide a technique for improving security performance when an unmanned flight vehicle is utilized for delivery of an item.

Solution to Problem

A server apparatus according to the present disclosure includes:

- a location information acquisition unit that acquires first location information indicating a location specified as a reception place for an item to be delivered by a flight vehicle, and second location information indicating a current location of a receiving person to receive the item;
- a determination unit that determines whether the location indicated by the first location information and the location indicated by the second location information when the flight vehicle is flying satisfy a predetermined criterion; and
- a flight vehicle control unit that transmits a command to the flight vehicle, and causes the flight vehicle to execute flight control for performing authentication of the receiving person, when it is determined that the predetermined criterion is satisfied.

A control method according to the present disclosure includes, by a computer:

- acquiring first location information indicating a location specified as a reception place for an item to be delivered by a flight vehicle, and second location information indicating a current location of a receiving person to receive the item;
- determining whether the location indicated by the first location information and the location indicated by the second location information when the flight vehicle is flying satisfy a predetermined criterion; and
- transmitting a command to the flight vehicle, and causing the flight vehicle to execute flight control for performing authentication of the receiving person, when it is determined that the predetermined criterion is satisfied.

A program according to the present disclosure causes a computer to function as:

- a location information acquisition unit that acquires first location information indicating a location specified as a reception place for an item to be delivered by a flight vehicle, and second location information indicating a current location of a receiving person to receive the item;
- a determination unit that determines whether the location indicated by the first location information and the location indicated by the second location information when the flight vehicle is flying satisfy a predetermined criterion; and
- a flight vehicle control unit that transmits a command to the flight vehicle, and causes the flight vehicle to execute flight control for performing authentication of the receiving person, when it is determined that the predetermined criterion is satisfied.

Advantageous Effects of Invention

The present invention can improve security performance when an unmanned flight vehicle is utilized for delivery of an item.

DESCRIPTION OF EMBODIMENTS

Figure 1:
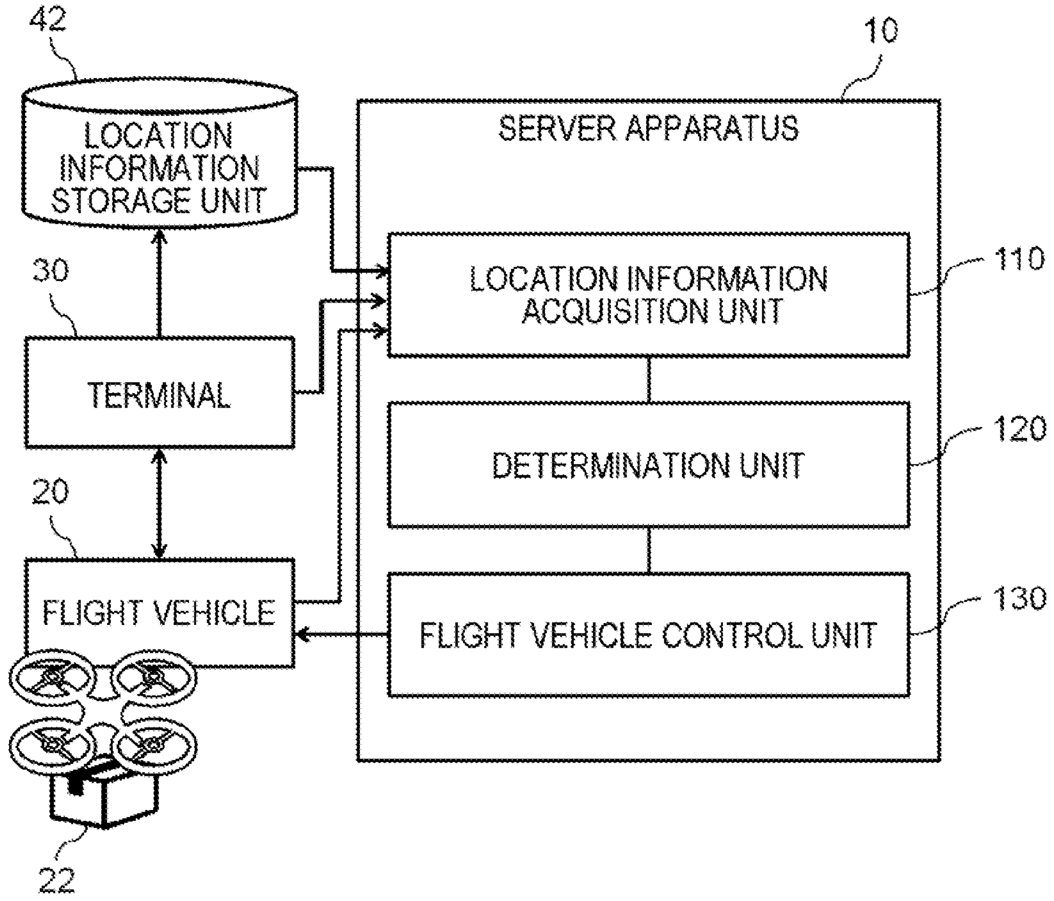
FIG. 1 It is a diagram illustrating a functional configuration of a server apparatus according to a first example embodiment.

Example embodiments according to the present invention are described below by use of the drawings. Note that, a similar reference sign is assigned to a similar component in all the drawings, and description will not be repeated as appropriate. Moreover, unless otherwise specially described, each block represents, in each block diagram, not a configuration on a hardware basis but a configuration on a function basis. Moreover, a direction of an arrow in the drawings serves for easy understanding of flow of information, and does not limit a direction of communication (one-way communication/two-way communication) unless otherwise specially described.

[Outline of Invention]

<Functional Configuration Example>

FIG. 1 is a diagram illustrating a functional configuration of a server apparatus 10 according to a first example embodiment. As illustrated in FIG. 1, the server apparatus 10 includes a location information acquisition unit 110, a determination unit 120, and a flight vehicle control unit 130.

The location information acquisition unit 110 acquires location information (hereinafter, also referred to as "first location information") indicating a location specified as a reception place for an item 22 to be delivered by a flight vehicle 20. Moreover, the location information acquisition unit 110 acquires location information (hereinafter, also referred to as "second location information") indicating a current location of a person (receiving person) to receive the item 22. The first location information and the second location information are pieces of information for identifying a specific point or area. The first location information and the second location information are, for example, pieces of information such as a coordinate value of a global geodetic system or a local geodetic system acquired via a global positioning system (GPS) module, and an address set at each point. Moreover, the first location information and the second location information may be pieces of image data acquired by capturing an image of an associated place.

For example, the first location information is specified by the requester at a delivery request of the item 22, and is stored in a storage unit (not illustrated) that manages information being related to delivery. For example, information of an address of a reception place input at delivery and coordinate information being associated with a location selected on a map are stored in the storage unit. Moreover, image data being associated with the address and coordinate information described above may be stored in the storage unit, by utilizing a map information system (not illustrated) that manages a location coordinate of each point and the image data in association with each other. For example, when receiving, from the flight vehicle 20, a notification indicating arrival at the collection place of the item 22, the location information acquisition unit 110 may acquire, from the storage unit, the first location information being associated with the item 22 being delivered by the flight vehicle 20. As another example, the location information acquisition unit 110 may acquire the first location information from the flight vehicle 20. For example, when arriving at the collection place of the item 22, the flight vehicle transmits, to the location information acquisition unit 110, location information (GPS information, address information, and the like) of a destination used in autonomous flight control. The location information acquisition unit 110 can acquire, as the first location information, the location information of the destination transmitted in this way.

The location information acquisition unit 110 may acquire the second location information from the terminal 30 previously registered as a terminal carried by the receiving person of the item 22. For example, the terminal 30 transmits, to the location information acquisition unit 110, location information such as GPS information acquired from its own GPS module and an access point of currently connected wireless fidelity (WiFi), periodically or in response to a request from the location information acquisition unit 110, as information indicating a current location of the receiving person carrying the terminal 30. Moreover, the terminal 30 may transmit, to the location information acquisition unit 110, image data generated by capturing an image of a surrounding of a reception place by use of a camera function, as information indicating a current location of the receiving person carrying the terminal 30. In this case, the location information acquisition unit 110 may convert, into location information, the image data received from the terminal 30, by utilizing a map information system (not illustrated) that manages a location coordinate of each point and image data in association with each other. Specifically, first, the location information acquisition unit 110 transmits the image data received from the terminal 30, to a map information system (not illustrated) as a query image. Then, the map information system (not illustrated) determines image data matching the query image (indicating a similarity to the query image being equal to or more than a criterion), and returns, to the location information acquisition unit 110, location information being associated with the image data. In this way, the location information acquisition unit 110 may convert the image data generated by the terminal 30 into location information. As another example, the location information acquisition unit 110 may refer to a location information storage unit 42 that collects location information from a plurality of terminals including a non-illustrated terminal, and acquire, as the second location information, latest location information of the terminal 30 as a target. The location information storage unit 42 is provided in the server apparatus 10 or another non-illustrated server apparatus communicatively connected to the server apparatus 10. As another example, the location information acquisition unit 110 may acquire the second location information via the flight vehicle 20 that has arrived at a reception place of the item 22. In this case, the terminal transmits, to the flight vehicle 20, the location information and image data as described above, via a non-illustrated near-field wireless communication module mounted on the flight vehicle 20. The flight vehicle 20 transmits, to the location information acquisition unit 110, location information and image data acquired from the terminal 30, by use of a long term evolution (LTE) network, a 5th generation (5G) network, or the like. The location information acquisition unit 110 acquires, as the second location information, location information and image data transmitted from the flight vehicle 20. Note that, the flight vehicle may transmit first location information together, when acquiring second location information from the terminal 30, and transmitting the second location information.

By use of the first location information and the second location information acquired by the location information acquisition unit 110, the determination unit 120 determines whether a receiving person is staying near a reception place before the flight vehicle 20 executes authentication of the person being present at the reception place. Specifically, the determination unit 120 determines whether a location indicated by the first location information and a location indicated by the second location information acquired when the flight vehicle 20 is flying satisfy a predetermined criterion. As one example, the determination unit 120 determines whether a distance determined by the location indicated by the first location information and the location indicated by the second location information is equal to or less than a predetermined threshold value. As another example, the location information acquisition unit 110 may determine that the location indicated by the first location information and the location indicated by the second location information belong to the same section (e.g., the same section in a 1/10 fine mesh unit).

When the determination unit 120 determines that the predetermined criterion is satisfied, the flight vehicle control unit 130 transmits a command relating to flight control of the flight vehicle 20, and causes the flight vehicle to execute flight control for performing authentication of the receiving person. The command is a command for causing the flight vehicle 20 to start flight control of moving to a location where authentication processing of the unauthenticated person staying at the reception place is possible (approaching an unauthenticated person).

<Hardware Configuration Example>

Each functional configuration unit of the server apparatus 10 may be achieved by hardware (example: hardwired electronic circuit or the like) that achieves each functional configuration unit, or may be achieved by a combination of hardware and software (example: a combination of an electronic circuit and a program that controls the electronic circuit, or the like). A case where each functional unit of the server apparatus 10 is achieved by a combination of hardware and software is further described below.

Figure 2:
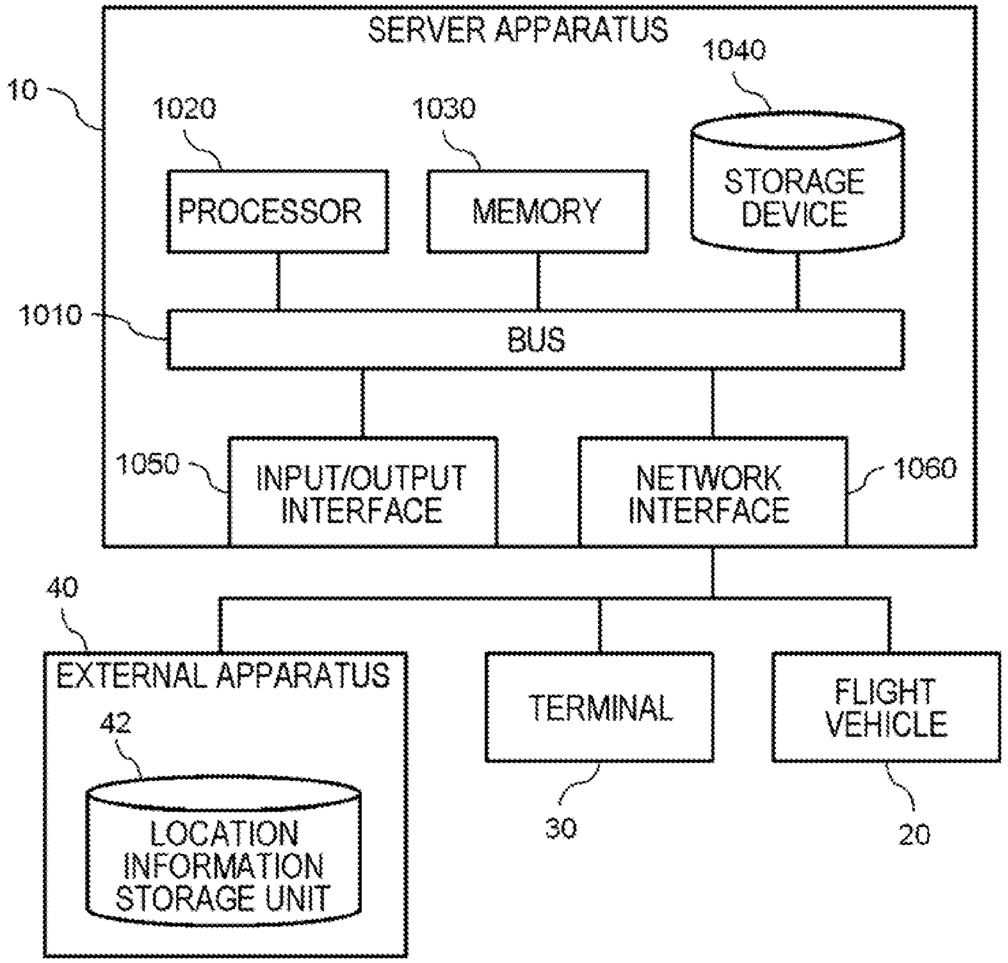
FIG. 2 It is a block diagram illustrating a hardware configuration of the server apparatus.

FIG. 2 is a block diagram illustrating a hardware configuration of the server apparatus 10. The server apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage device achieved by a random access memory (RAM) or the like.

The storage device 1040 is an auxiliary storage device achieved by a hard disk drive (HDD), a solid state drive (SSD), a memory card, a read only memory (ROM), or the like. The storage device 1040 stores a program module that achieves each function (the location information acquisition unit 110, the determination unit 120, the flight vehicle control unit 130, and the like) of the server apparatus 10. The processor 1020 reads each of the program modules onto the memory 1030, executes the read program module, and thereby achieves each function being associated with the program module. The storage device 1040 can function as the location information storage unit 42.

The input/output interface 1050 is an interface for connecting the server apparatus 10 to various kinds of input/output equipment. For example, input equipment such as a mouse, a keyboard, and a touch panel, output equipment such as a display and a speaker, and the like are connectable to the input/output interface 1050.

The network interface 1060 is an interface for connecting the server apparatus 10 to another apparatus on a network. The network is, for example, a local area network (LAN) or a wide area network (WAN). A method of connecting the network interface 1060 to a network may be wireless connection, or may be wired connection. The location information acquisition unit 110 and the flight vehicle control unit 130 can communicate with the flight vehicle 20 via the network interface 1060. Moreover, the location information acquisition unit 110 can communicate, via the network interface 1060, with the terminal 30 used by a receiving person. Moreover, the location information acquisition unit 110 can communicate, via the network interface 1060, with an external apparatus 40 including the location information storage unit 42.

Note that, the hardware configuration illustrated in FIG. 2 is merely one example. The hardware configuration of the server apparatus 10 according to the present disclosure is not limited to the example of FIG. 2.

<Flow of Processing>

Figure 3:
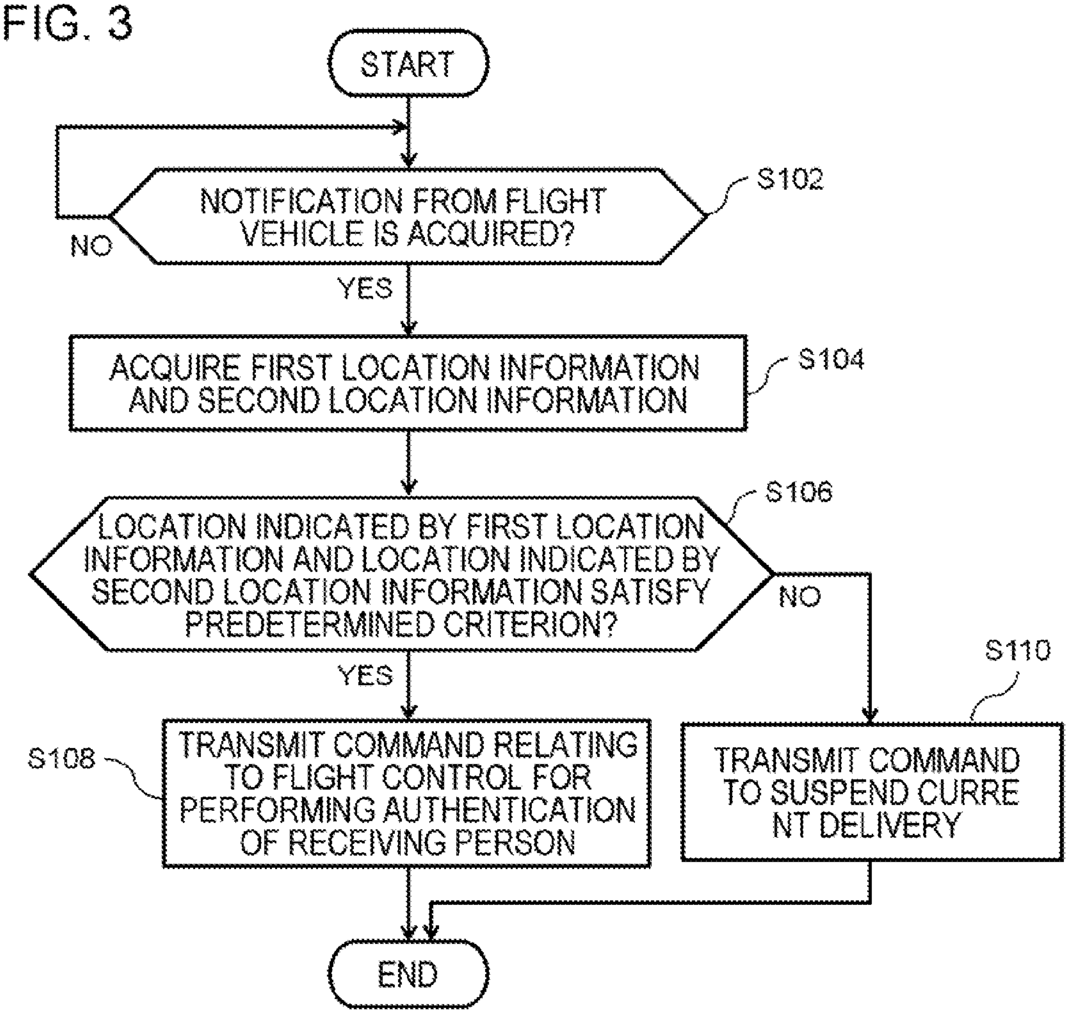
FIG. 3 It is a flowchart illustrating a flow of processing executed by the server apparatus according to the first example embodiment.

A flow of processing executed by the server apparatus 10 according to the first example embodiment is described by use of FIG. 3. FIG. 3 is a flowchart illustrating a flow of processing executed by the server apparatus 10 according to the first example embodiment.

First, the location information acquisition unit 110 waits until receiving, from the flight vehicle 20 delivering the item 22, a notification transmitted in response to arrival at a location specified as a reception place of the item 22 (S102: NO). When the flight vehicle 20 arrives at the location specified as the reception place of the item 22, the flight vehicle 20 transmits a predetermined notification to the server apparatus 10. When receiving reception of the notification from the flight vehicle 20 (S102: YES), the location information acquisition unit 110 acquires the first location information and the second location information by such a method as described above (S104).

When the location information acquisition unit 110 acquires the first location information and the second location information, the determination unit 120 determines whether the location indicated by the first location information and the location indicated by the second location information satisfy a predetermined criterion (S106). For example, when a distance between the location indicated by the first location information and the location indicated by the second location information is equal to or less than a predetermined threshold value, the determination unit 120 can determine that the predetermined criterion is satisfied. Moreover, for example, when a section to which the location indicated by the first location information belongs and a section to which the location indicated by the second location information belongs are the same, the determination unit 120 can determine that the predetermined criterion is satisfied.

When the determination unit 120 determines that the predetermined criterion is satisfied (S106: YES), the flight vehicle control unit 130 transmits, to the flight vehicle 20, a command relating to flight control for performing authentication of a receiving person (S108). When receiving the command, the flight vehicle 20 starts moving to a location where authentication of an unauthenticated person being present at a reception place is possible.

When the flight vehicle 20 approaches the location where authentication of the unauthenticated person being present at the collection place is possible, personal authentication processing is executed. As one example, biometric authentication processing using biometric information of a person is executed. In this case, the biological information is acquired by use of various sensors such as an image sensor and a microphone mounted on the flight vehicle 20 or the terminal 30. As another example, processing of collating an image for authentication with an image displayed on a terminal of a person staying at a reception place is executed. The image for authentication is generated, for example, in a flow of a delivery request of the item 22. The generated image for authentication is saved in a predetermined storage unit, and previously transmitted to a terminal used by a receiving person having a legitimate right regarding the item 22. The receiving person displays the previously transmitted image for authentication on a display of the terminal 30 in a place specified as a reception place of the item 22, and directs the image for authentication to a camera of the flight vehicle 20. The flight vehicle 20 captures, by use of a mounted camera, an image of a display screen of the terminal 30 of the person staying at the collection place, and, thereby, an image to be collated with an image for authentication saved in a predetermined storage unit is generated. Such authentication processing may be executed by the server apparatus 10, or may be executed by a processor mounted on the flight vehicle 20. When the person staying at the collection place is authenticated as the receiving person of the item 22, the flight vehicle 20 further approaches the receiving person, and hands over the item 22 to the receiving person.

Moreover, when the determination unit 120 determines that the predetermined criterion is not satisfied (S106: NO), the flight vehicle control unit 130 does not transmit the command in the processing in S108. In this case, the flight vehicle 20 maintains a safe altitude without approaching a location where authentication of a receiving person is possible. Note that, as illustrated, the flight vehicle control unit 130 may be configured in such a way as to transmit, to the flight vehicle 20, a command to suspend current delivery differing from the command in S108 (S110). For example, the flight vehicle control unit 130 may transmit, to the flight vehicle 20, a command to once return to a delivery base at a departure point. Moreover, when an item other than the item 22 currently being delivered is loaded on the flight vehicle 20, the flight vehicle control unit 130 may suspend delivery of the item 22, and transmit a command to deliver the other item.

<Exemplification of Advantageous Effect>

As described above, according to the present example embodiment, a location of a reception place specified by a receiving person is compared with a current location of a terminal owned by the receiving person, before the flight vehicle 20 performs personal authentication. Then, when a result of comparing the two locations satisfies a predetermined criterion, a command to cause the flight vehicle 20 to execute flight control for performing authentication of the receiving person is transmitted to the flight vehicle 20. For example, when a distance between a location of the reception place specified by the receiving person and a current location of the terminal owned by the receiving person is less than a predetermined threshold value, the command described above is transmitted to the flight vehicle 20. In response to reception of the command, the flight vehicle 20 approaches the unauthenticated person being present at a collection place, and executes personal authentication processing. Security performance when the item 22 is delivered by use of the flight vehicle 20 can be enhanced by moving the flight vehicle 20 to a location where personal authentication is possible, in response to a fact that presence of the receiving person near the reception place can be confirmed based on the current location of the receiving person. For example, occurrence of such a problem that a third party who does not have a legitimate right regarding the item 22 stays at a reception place, the flight vehicle 20 suffers some attack as a result of carelessly approaching the third party, and the item 22 is stolen can be suppressed.

Second Example Embodiment

The present example embodiment includes a configuration similar to that according to the first example embodiment, except for points described below.

<Functional Configuration Example>

A server apparatus 10 according to the present example embodiment includes a functional configuration (example: FIG. 1) similar to that according to the first example embodiment. A flight vehicle control unit 130 according to the present example embodiment generates information for adjusting a location to which the flight vehicle 20 moves, based on a comparison result between image data of a reception place captured by a receiving person and criterion image data previously associated with each location, and includes the information in a command to the flight vehicle 20. Herein, for example, image data of a map information system (not illustrated) that manages a location coordinate of each point and the image data in association with each other are used as the criterion image data.

<Flow of Processing>

Figure 4:
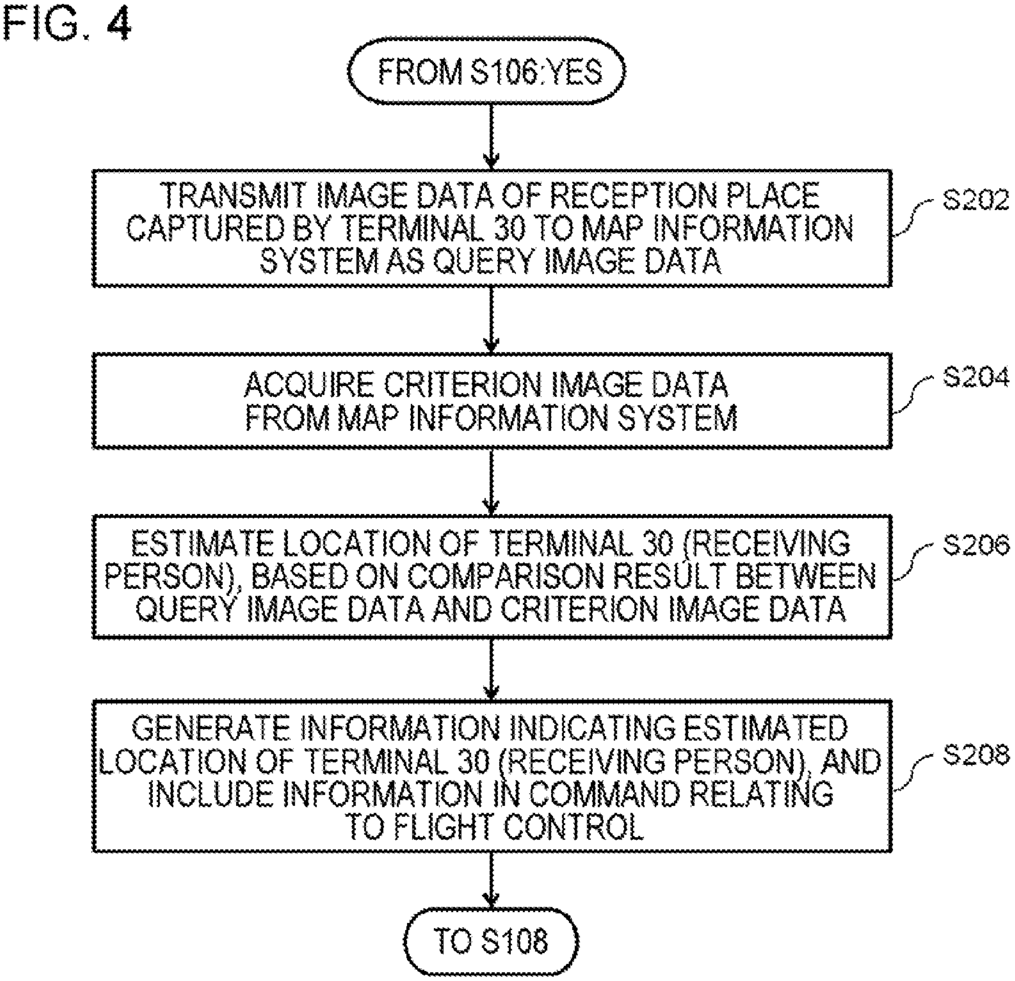
FIG. 4 It is a flowchart illustrating a flow of processing executed by a server apparatus according to a second example embodiment.

A flow of processing executed by the server apparatus 10 according to the present example embodiment is described by use of FIG. 4. FIG. 4 is a flowchart illustrating a flow of processing executed by the server apparatus 10 according to the second example embodiment. The server apparatus 10 according to the present example embodiment further executes steps in S202 to S208 illustrated in the flowchart in FIG. 4, in addition to the steps in S102 to S110 illustrated in the flowchart in FIG. 3. The steps are executed when determination processing in S106 in the flowchart in FIG. 3 is "YES". The additional steps (S202 to S208) are mainly described below.

In S104, the location information acquisition unit 110 acquires, as second location information, image data of a reception place captured by use of a camera function of a terminal 30. The flight vehicle control unit 130 transmits, as query image data, the image data acquired as the second location information, to a map information system (not illustrated) that manages a location coordinate of each point and the image data in association with each other (S202).

The map information system (not illustrated) determines, as criterion image data, image data matching the query image data (having a similarity to the query image data equal to or more than a criterion). The flight vehicle control unit 130 acquires the criterion image data determined in this way from the map information system (not illustrated) (S204).

Then, the flight vehicle control unit 130 estimates a location of the terminal 30 (receiving person) when the query image data are generated, based on a comparison result between the query image data and the criterion image data (S206). The flight vehicle control unit 130 can estimate a location of the terminal 30 when the query image data are generated, for example, based on a location relationship between a predetermined object captured in the query image data and the predetermined object captured in the criterion image data. Note that, as the "predetermined object", for example, a building, a landmark, a sign, or the like having identity due to a unique shape, design, or the like is utilizable. The flight vehicle control unit 130 can estimate a current location of the terminal 30 (receiving person) by correcting the location information of the criterion image data by use of a difference in a location of the predetermined object between the query image data and the criterion image data.

Then, the flight vehicle control unit 130 generates information indicating the location of the terminal 30 (receiving person) estimated in the processing in S206, and includes the generated information in a command relating to flight control for performing authentication of the receiving person (S208). Thereafter, the flight vehicle control unit 130 transmits, to the flight vehicle 20, a command relating to flight control for performing authentication of the receiving person, as described by use of the flowchart in FIG. 3.

<Exemplification of Advantageous Effect>

As described above, according to the present example embodiment, by use of a result of comparing image data captured by a receiving person with the terminal 30 with criterion image data with which location information is previously associated, the location information being associated with the criterion image data is corrected. Then, the corrected location information is included in a command for flight control, as information indicating a location to which the flight vehicle 20 should move. In this way, accuracy of a location of the receiving person is enhanced, and, therefore, the flight vehicle 20 becomes able to move to a more appropriate location, when a person being present at a reception place is authenticated.

Third Example Embodiment

The present example embodiment includes a configuration similar to that according to each of the first and second example embodiments except for the point described below.

<Functional Configuration Example>

A server apparatus 10 according to the present example embodiment includes a functional configuration (example: FIG. 1) similar to that according to each of the first and second example embodiments. A determination unit 120 according to the present example embodiment further determines whether second location information is generated in a reception time period specified as a time period for receiving an item 22. The determination unit 120 according to the present example embodiment further performs determination of whether a location indicated by first location information and a location indicated by the second location information satisfy a predetermined criterion, when it is determined that the second location information is generated in the reception time period.

<Flow of Processing>

Figure 5:
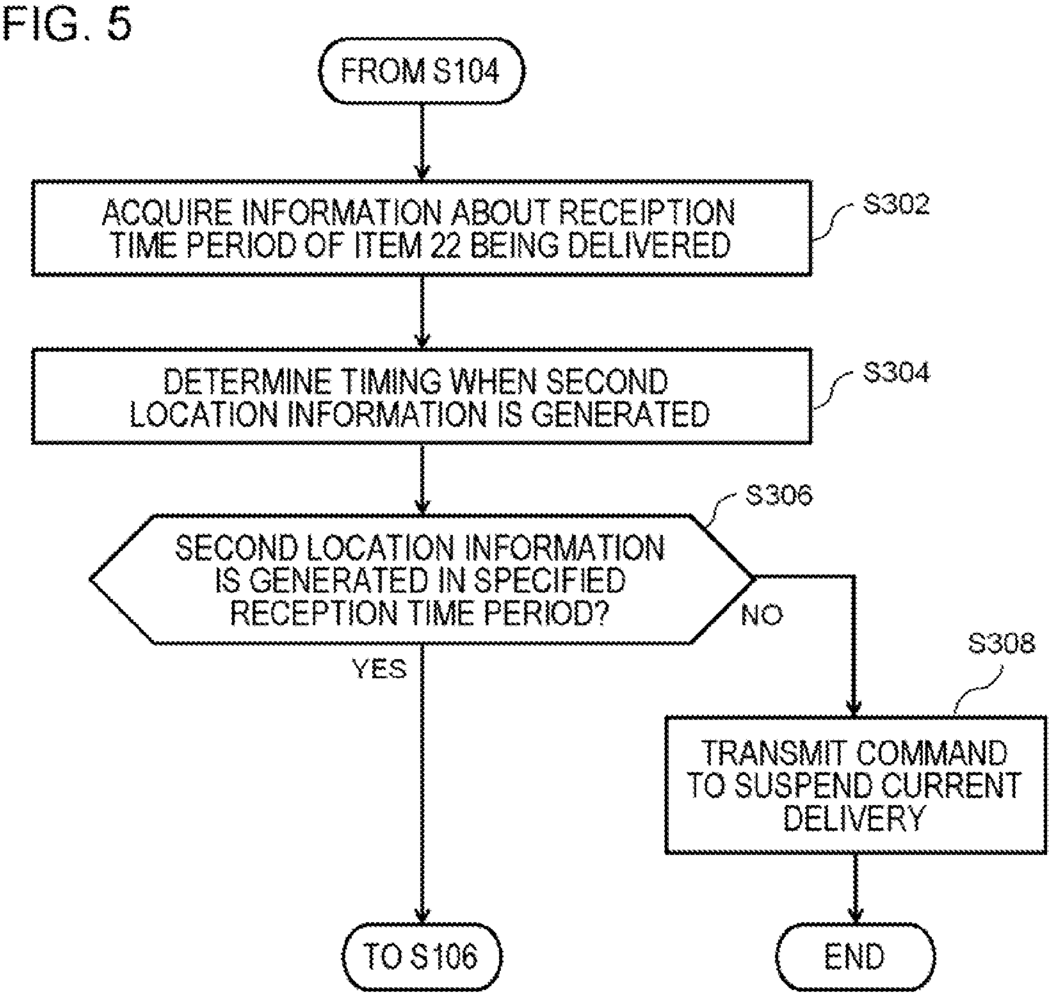
FIG. 5 It is a flowchart illustrating a flow of processing executed by a server apparatus according to a third example embodiment.

A flow of processing executed by the server apparatus 10 according to the present example embodiment is described by use of FIG. 5. FIG. 5 is a flowchart illustrating the flow of processing executed by the server apparatus 10 according to the third example embodiment. The server apparatus 10 according to the present example embodiment further executes steps in S302 to S308 illustrated in the flowchart in FIG. 5, in addition to the steps S102 to S110 illustrated in the flowchart in FIG. 3. The steps are executed, for example, after the processing of S104 in the flowchart in FIG. 3. The additional steps (S302 to S308) are mainly described below. Note that, although not illustrated, the server apparatus 10 according to the present example embodiment may be configured in such a way as to further execute processing described in the second example embodiment.

The determination unit 120 acquires information about the reception time period previously specified regarding the item 22 delivered by a flight vehicle 20 (S302). The information about the reception time period is specified, for example, by a requester at a delivery request of the item 22, and is stored in a storage unit (not illustrated) that manages information being related to delivery. In this case, in processing of S102, the determination unit 120 acquires, from the flight vehicle 20, a notification including, for example, information for identification such as an identifier (ID) of the flight vehicle and an ID of the item 22 being delivered (an ID allocated for each delivery request). Then, the determination unit 120 can acquire, from the storage unit described above, information relating to a reception time period being associated with the information for identification included in the notification acquired from the flight vehicle 20.

Moreover, the determination unit 120 determines a timing when the second location information acquired in processing of S104 is generated (S304). For example, the determination unit 120 can utilize, as a timing when the second location information is generated, a time when the second location information is transmitted from a terminal 30, or a time when the second location information is received. In addition, when the second location information is image data, the determination unit 120 can determine, based on a time stamp of data generation included in metadata of the image data, a timing when the second location information is generated.

Then, the determination unit 120 determines, based on the generation timing of the second location information determined in the processing in S304, and the reception time period acquired in the processing in S302, whether the second location information is generated in the specified reception time period (S306). When it is determined that the second location information is generated in the specified reception time period (S306: YES), the determination unit 120 further executes determination processing of S106. Then, as described in the first example embodiment, when the two pieces of location information satisfy a predetermined criterion, a flight control command for performing personal authentication is transmitted from the flight vehicle control unit 130 to the flight vehicle 20. On the other hand, when it is determined that the second location information is generated in a time period differing from the specified reception time period (S306: NO), the determination unit 120 does not execute the determination processing of S106. In this case, as illustrated, the flight vehicle control unit 130 may be configured in such a way as to transmit a command to suspend the current delivery (S308). For example, the flight vehicle control unit 130 may transmit, to the flight vehicle 20, a command to once return to a delivery base at a departure point. Moreover, when an item other than an item currently being delivered is loaded on the flight vehicle 20, the flight vehicle control unit 130 may suspend the current delivery, and transmit a command to deliver the other item.

<Exemplification of Advantageous Effect>

As described above, according to the present example embodiment, it is determined whether to perform determination based on location information, based on a timing when second location information indicating a current location of a receiving person of an item being delivered by the flight vehicle is generated. In this way, by determining a probability that the receiving person is actually present at the reception place based on a reception time period specified for the item being delivered, security performance when an item is delivered by the flight vehicle 20 can be further enhanced.

While the example embodiments according to the present invention have been described above with reference to the drawings, the present invention should not be limited to the example embodiments and interpreted accordingly, and various modifications, improvements, and the like can be made based on knowledge of a person skilled in the art without departing from the spirit of the present invention. Moreover, various inventions can be formed by an appropriate combination of a plurality of components disclosed in the example embodiment. For example, some of all the components disclosed in the example embodiments may be deleted, or components according to differing example embodiments may be combined as appropriate.

Moreover, although a plurality of steps (pieces of processing) are described in order in a plurality of flowcharts used in the above description, an execution order of steps executed in each example embodiment is not limited to the described order. In each example embodiment, an order of illustrated steps can be changed to an extent that causes no problem in terms of content. Moreover, each of the example embodiments described above can be combined to an extent that content does not contradict.

Some or all of the above-described example embodiments can also be described as, but are not limited to, the following supplementary notes.

1. A server apparatus including:
   a location information acquisition unit that acquires first location information indicating a location specified as a reception place for an item to be delivered by a flight vehicle, and second location information indicating a current location of a receiving person to receive the item;
   a determination unit that determines whether the location indicated by the first location information and the location indicated by the second location information when the flight vehicle is flying satisfy a predetermined criterion; and
   a flight vehicle control unit that transmits a command to the flight vehicle, and causes the flight vehicle to execute flight control for performing authentication of the receiving person, when it is determined that the predetermined criterion is satisfied.
2. The server apparatus according to supplementary note 1, in which
   the flight vehicle control unit causes, by the command, the flight vehicle to execute flight control of moving to a location where authentication of the receiving person is possible.
3. The server apparatus according to supplementary note 2, in which
   the flight vehicle control unit generates information for adjusting a location to which the flight vehicle moves, based on a comparison result between image data of the reception place captured by the receiving person and criterion image data being associated with each location, and includes the information in the command.
4. The server apparatus according to any one of supplementary notes 1 to 3, in which
   the determination unit
   further determines whether the second location information is generated in a time period specified as a time period for receiving the item, and
   performs determination of whether the predetermined criterion is satisfied, when it is determined that the second location information is generated in the time period.
5. The server apparatus according to any one of supplementary notes 1 to 4, in which
   the location information acquisition unit acquires, as the second location information, terminal location information indicating a location of a terminal owned by the receiving person.
6. The server apparatus according to supplementary note 5, in which
   the location information acquisition unit acquires, as the terminal location information, image data of the reception place captured by the terminal.
7. The server apparatus according to any one of supplementary notes 1 to 6, in which
   the determination unit determines that the predetermined criterion is satisfied, when a distance determined by the location indicated by the first location information and the location indicated by the second location information is equal to or less than a predetermined threshold value, or when the location indicated by the first location information and the location indicated by the second location information belong to a same section.
8. The server apparatus according to any one of supplementary notes 1 to 7, in which
   when it is determined that the predetermined criterion is not satisfied, the flight vehicle control unit transmits, to the flight vehicle, a command to suspend delivery of the item.
9. The server apparatus according to supplementary note 8, in which
   the command to suspend delivery of the item includes one of a command that causes the flight vehicle to return to a departure point in delivery of the item, and a command that prioritizes delivery of another item loaded on the flight vehicle.
10. A control method including,
   by a computer:
   acquiring first location information indicating a location specified as a reception place for an item to be delivered by a flight vehicle, and second location information indicating a current location of a receiving person to receive the item;
   determining whether the location indicated by the first location information and the location indicated by the second location information when the flight vehicle is flying satisfy a predetermined criterion; and
   transmitting a command to the flight vehicle, and causing the flight vehicle to execute flight control for performing authentication of the receiving person, when it is determined that the predetermined criterion is satisfied.

11. The control method according to supplementary note 10, further including by the computer, causing, by the command, the flight vehicle to execute flight control of moving to a location where authentication of the receiving person is possible.

12. The control method according to supplementary note 11, further including by the computer, generating information for adjusting a location to which the flight vehicle moves, based on a comparison result between image data of the reception place captured by the receiving person and criterion image data being associated with each location, and including the information in the command.

13. The control method according to any one of supplementary notes 10 to 12, further including by the computer, further determining whether the second location information is generated in a time period specified as a time period for receiving the item, and performing determination of whether the predetermined criterion is satisfied, when it is determined that the second location information is generated in the time period.

14. The control method according to any one of supplementary notes 10 to 13, further including by the computer, acquiring, as the second location information, terminal location information indicating a location of a terminal owned by the receiving person.

15. The control method according to supplementary note 14, further including by the computer, acquiring, as the terminal location information, image data of the reception place captured by the terminal.

16. The control method according to any one of supplementary notes 10 to 15, further including by the computer, determining that the predetermined criterion is satisfied, when a distance determined by the location indicated by the first location information and the location indicated by the second location information is equal to or less than a predetermined threshold value, or when the location indicated by the first location information and the location indicated by the second location information belong to a same section.

17. The control method according to any one of supplementary notes 10 to 16, further including by the computer, when it is determined that the predetermined criterion is not satisfied, transmitting, to the flight vehicle, a command to suspend delivery of the item.

18. The control method according to supplementary note 17, in which the command to suspend delivery of the item includes one of a command that causes the flight vehicle to return to a departure point in delivery of the item, and a command that prioritizes delivery of another item loaded on the flight vehicle.

19. A program causes a computer to function as:

a location information acquisition unit that acquires first location information indicating a location specified as a reception place for an item to be delivered by a flight vehicle, and second location information indicating a current location of a receiving person to receive the item;

a determination unit that determines whether the location indicated by the first location information and the location indicated by the second location information when the flight vehicle is flying satisfy a predetermined criterion; and a flight vehicle control unit that transmits a command to the flight vehicle, and causes the flight vehicle to execute flight control for performing authentication of the receiving person, when it is determined that the predetermined criterion is satisfied.

20. The program according to supplementary note 19, in which the flight vehicle control unit causes, by the command, the flight vehicle to execute flight control of moving to a location where authentication of the receiving person is possible.

21. The program according to supplementary note 20, in which the flight vehicle control unit generates information for adjusting a location to which the flight vehicle moves, based on a comparison result between image data of the reception place captured by the receiving person and criterion image data being associated with each location, and includes the information in the command.

22. The program according to any one of supplementary notes 19 to 21, in which the determination unit further determines whether the second location information is generated in a time period specified as a time period for receiving the item, and performs determination of whether the predetermined criterion is satisfied, when it is determined that the second location information is generated in the time period.

23. The program according to any one of supplementary notes 19 to 22, in which the location information acquisition unit acquires, as the second location information, terminal location information indicating a location of a terminal owned by the receiving person.

24. The program according to supplementary note 23, in which the location information acquisition unit acquires, as the terminal location information, image data of the reception place captured by the terminal.

25. The program according to any one of supplementary notes 19 to 24, in which the determination unit determines that the predetermined criterion is satisfied, when a distance determined by the location indicated by the first location information and the location indicated by the second location information is equal to or less than a predetermined threshold value, or when the location indicated by the first location information and the location indicated by the second location information belong to a same section.

26. The program according to any one of supplementary notes 19 to 25, in which when it is determined that the predetermined criterion is not satisfied, the flight vehicle control unit transmits, to the flight vehicle, a command to suspend delivery of the item.

27 The program according to supplementary note 26, in which the command to suspend delivery of the item includes one of a command that causes the flight vehicle to return to a departure point in delivery of the item, and a command that prioritizes delivery of another item loaded on the flight vehicle.

REFERENCE SIGNS LIST

10 Server apparatus
1010 Bus
1020 Processor
1030 Memory
1040 Storage device
1050 Input/output interface
1060 Network interface
110 Location information acquisition unit
120 Determination unit
130 Flight vehicle control unit
20 Flight vehicle
22 Item
30 Terminal
40 External apparatus
42 Location information storage unit

What is claimed is:

1. A server apparatus comprising:
at least one memory configured to store instructions; and
at least one processor configured to execute the instructions to perform operations, the operations comprising:
acquiring first location information indicating a location specified as a reception place for an item to be delivered by a flight vehicle, and second location information indicating at least one of: (i) a current location of a receiving person and (ii) situation information, including image data, of the reception place from which a location or presence/absence of a person at the reception place is inferable;
determining, when the flight vehicle is flying, whether a criterion for confirming that the receiving person is present near the reception place is satisfied based on the first location information and the second location information, the criterion including at least one of: (i) a relationship between the location indicated by the first location information and a location represented by the second location information and (ii) a third party other than an authorized person is not present within a region around the reception place during a specified reception time period; and
transmitting a command to the flight vehicle, and causing the flight vehicle to execute flight control for performing, when it is determined that the criterion is satisfied, at least one of: (i) authentication of the receiving person and (ii) delivery control including approach, descent and release of the item at the reception place,
wherein the operations further comprise:
determining whether the second location information is generated in a time period specified as a time period for receiving the item, and
performing determination of whether the criterion is satisfied, when it is determined that the second location information is generated in the time period.

2. The server apparatus according to claim 1, wherein the operations further comprise causing, by the command, the flight vehicle to execute flight control of moving to a location where authentication of the receiving person is possible.

3. The server apparatus according to claim 2, wherein the operations further comprise generating information for adjusting a location to which the flight vehicle moves, based on a comparison result between image data of the reception place captured by the receiving person and criterion image data being associated with each location, and including the information in the command.

4. The server apparatus according to claim 1, wherein the operations further comprise acquiring, as the second location information, terminal location information indicating a location of a terminal owned by the receiving person.

5. The server apparatus according to claim 4, wherein the operations further comprise acquiring, as the terminal location information, the image data of the reception place captured by the terminal.

6. The server apparatus according to claim 1, wherein the operations further comprise determining that the criterion is satisfied, when a distance determined by the location indicated by the first location information and the location indicated by the second location information is equal to or less than a predetermined threshold value, or when the location indicated by the first location information and the location indicated by the second location information belong to a same section.

7. The server apparatus according to claim 1, wherein the operations further comprise,
when it is determined that the criterion is not satisfied, transmitting, to the flight vehicle, a command to suspend delivery of the item.

8. The server apparatus according to claim 7, wherein the command to suspend delivery of the item includes one of a command that causes the flight vehicle to return to a departure point in delivery of the item, and a command that prioritizes delivery of another item loaded on the flight vehicle.

9. A control method comprising,
by a computer:
acquiring first location information indicating a location specified as a reception place for an item to be delivered by a flight vehicle, and second location information indicating at least one of: (i) a current location of a receiving person and (ii) situation information, including image data, of the reception place from which a location or presence/absence of a person at the reception place is inferable;
determining, when the flight vehicle is flying, whether a criterion for confirming that the receiving person is present near the reception place is satisfied based on the first location information and the second location information, the criterion including at least one of: (i) a relationship between the location indicated by the first location information and a location represented by the second location information and (ii) a third party other than an authorized person is not present within a region around the reception place during a specified reception time period; and
transmitting a command to the flight vehicle, and causing the flight vehicle to execute flight control for performing, when it is determined that the criterion is satisfied, at least one of: (i) authentication of the receiving person and (ii) delivery control including approach, descent and release of the item at the reception place,
wherein the control method further comprises:
determining whether the second location information is generated in a time period specified as a time period for receiving the item, and
performing determination of whether the criterion is satisfied, when it is determined that the second location information is generated in the time period.

10. A non-transitory computer readable medium storing a program for causing a computer to perform operations, the operations comprising:

acquiring first location information indicating a location specified as a reception place for an item to be delivered by a flight vehicle, and second location information indicating at least one of: (i) a current location of a receiving person and (ii) situation information, including image data, of the reception place from which a location or presence/absence of a person at the reception place is inferable;

determining, when the flight vehicle is flying, whether a criterion for confirming that the receiving person is present near the reception place is satisfied based on the first location information and the second location information, the criterion including at least one of: (i) a relationship between the location indicated by the first location information and a location represented by the second location information and (ii) a third party other than an authorized person is not present within a region around the reception place during a specified reception time period; and transmitting a command to the flight vehicle, and causing the flight vehicle to execute flight control for performing, when it is determined that the criterion is satisfied, at least one of: (i) authentication of the receiving person and (ii) delivery control including approach, descent and release of the item at the reception place, wherein the operations further comprise:

determining whether the second location information is generated in a time period specified as a time period for receiving the item, and performing determination of whether the criterion is satisfied, when it is determined that the second location information is generated in the time period.

* * * * *